US007404987B2

(12) United States Patent
Karunaratne et al.

(10) Patent No.: US 7,404,987 B2
(45) **Date of Patent: *Jul. 29, 2008**

(54) WHITE PEARLESCENT PAINT COMPOSITIONS AND COATINGS

(75) Inventors: Nirupama Karunaratne, Ontario (CA); Ken Johnson, Ontario (CA); Hiroki Kanaya, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 484 days.

This patent is subject to a terminal disclaimer.

(21) Appl. No.: 10/665,365

(22) Filed: Sep. 22, 2003

(65) Prior Publication Data

US 2004/0116554 A1 Jun. 17, 2004

(51) Int. Cl.
*B05D 7/00* (2006.01)
*B05D 7/16* (2006.01)
*B05D 1/36* (2006.01)

(52) U.S. Cl. .............. 427/407.1; 427/419.1; 427/419.2; 427/419.5

(58) Field of Classification Search .............. 427/376.2, 427/376.6, 385.5, 418, 419.2, 407.1
See application file for complete search history.

(56) References Cited

U.S. PATENT DOCUMENTS

| | | | | |
|---|---|---|---|---|
| 2,662,027 | A | | 12/1953 | Pike |
| 3,627,553 | A | | 12/1971 | Clark et al. |
| 3,709,709 | A | | 1/1973 | Torok et al. |
| 3,718,494 | A | | 2/1973 | Jacobson |
| 3,861,946 | A | | 1/1975 | Waitkins et al. |
| 3,953,643 | A | | 4/1976 | Cheung et al. |
| 4,359,504 | A | | 11/1982 | Troy |
| 4,373,963 | A | | 2/1983 | Uenishi et al. |
| 4,416,940 | A | | 11/1983 | Loye et al. |
| 4,499,143 | A | | 2/1985 | Panush |
| 4,546,007 | A | | 10/1985 | Abe et al. |
| 4,551,491 | A | | 11/1985 | Panush |
| 4,615,940 | A | | 10/1986 | Panush et al. |
| 4,780,140 | A | | 10/1988 | Franz et al. |
| 4,814,208 | A | | 3/1989 | Miyazaki et al. |
| 4,952,245 | A | | 8/1990 | Iwano et al. |
| 4,978,394 | A | | 12/1990 | Ostertag et al. |
| 4,978,708 | A | * | 12/1990 | Fowler et al. ............... 524/507 |
| 5,009,711 | A | | 4/1991 | Emmert et al. |
| 5,025,041 | A | | 6/1991 | Pfenninger et al. |
| 5,234,496 | A | | 8/1993 | Keiser |
| 5,266,107 | A | | 11/1993 | Hoffman |
| 5,556,527 | A | | 9/1996 | Igarashi et al. |
| 5,607,504 | A | | 3/1997 | Schmid et al. |
| 5,624,486 | A | | 4/1997 | Schnid et al. |
| 5,624,731 | A | | 4/1997 | Desjardins |
| 5,626,661 | A | | 5/1997 | Schmid et al. |
| 5,688,314 | A | | 11/1997 | Nishimagi et al. |
| 5,702,519 | A | | 12/1997 | Nitta et al. |
| 5,718,950 | A | | 2/1998 | Komatsu et al. |
| 5,733,364 | A | | 3/1998 | Schmid et al. |
| 5,871,827 | A | | 2/1999 | Jaffe et al. |
| 5,958,125 | A | | 9/1999 | Schmid et al. |
| 5,964,936 | A | | 10/1999 | Reisser |
| 6,139,614 | A | | 10/2000 | Schmid et al. |
| 6,176,918 | B1 | | 1/2001 | Glausch et al. |
| 6,238,472 | B1 | | 5/2001 | Andes et al. |
| 6,280,520 | B1 | | 8/2001 | Andes et al. |
| 6,291,065 | B1 | | 9/2001 | Poetsch et al. |
| 6,294,010 | B1 | | 9/2001 | Pfaff et al. |
| 6,350,509 | B1 | | 2/2002 | Sada et al. |
| 6,398,862 | B1 | | 6/2002 | Hechler et al. |
| 2001/0033892 | A1 | | 10/2001 | Iizuka ........................ 427/140 |
| 2002/0043464 | A1 | | 4/2002 | Miyatake |
| 2002/0076546 | A1 | | 6/2002 | Johnson |
| 2004/0116554 | A1 | | 6/2004 | Karunaratne et al. ........ 523/171 |

FOREIGN PATENT DOCUMENTS

| | | | |
|---|---|---|---|
| DE | 4432225 | A1 | 3/1996 |
| EP | 1160295 | A1 | 6/2001 |
| GB | 1032057 | | 6/1966 |
| GB | 2360783 | A | 2/2001 |
| GB | 2397066 | | 7/2004 |
| JP | 03076764 | | 4/1991 |
| JP | 11-10081 | | 1/1999 |
| WO | WO97/29059 | | 2/1997 |
| WO | WO0224777 | A2 | 9/2002 |
| ZA | 94505 | | 8/1994 |

* cited by examiner

*Primary Examiner*—William P Fletcher, III
(74) *Attorney, Agent, or Firm*—Morgan, Lewis & Bockius LLP

(57) ABSTRACT

A pearlescent paint composition comprising a film-former and a solids material comprising a pearlizing effective amount of a pearlizing compound, a hiding material and a pigment, the improvement wherein the pigment is white and the hiding material is selected from the groups consisting of metals selected from particulate aluminum, zinc, copper, nickel, stainless steel and alloys thereof, and compounds selected from aluminum oxide, aluminum silicate, hydrated magnesium aluminum silicate, silica, mica aluminum silicate, magnesium oxide, calcium carbonate, calcium sulphate, calcium metasilicate, anhydrous sodium potassium aluminum silicate, sodium aluminum silicate, alumina trihydrate and barium sulphate in, respective, effective whitening and hiding amounts. Preferably, the pearlizing compound is a mica, the hiding material is particulate aluminum and the white pigment is titanium. The combination of the three types of compounds in the desired pearlescent finishes, particularly on vehicle bodies, provides the most advantageous option of requiring only a two-coat system.

11 Claims, 12 Drawing Sheets

* Honda 2C1B refers to the 2 Coat White Pearl according to the present invention

* 3C1B refers to Conventional 3 Coat System

*Honda 2C1B refers to the 2 Coat White Pearl according to the present invention
*3C1B refers to Conventional 3 Coat System

*Honda 2C1B refers to the 2 Coat White Pearl according to the present invention
*3C1B refers to Conventional 3 Coat System

*Honda 2C1B refers to the 2 Coat White Pearl according to the present invention
*3C1B refers to Conventional 3 Coat System

*Honda 2C1B refers to the 2 Coat White Pearl according to the present invention
*3C1B refers to Conventional 3 Coat System

*Honda 2C1B refers to the 2 Coat White Pearl according to the present invention
*3C1B refers to Conventional 3 Coat System

*Honda 2C1B refers to the 2 Coat White Pearl according to the present invention
*3C1B refers to Conventional 3 Coat System

WHITE PEARLESCENT PAINT COMPOSITIONS AND COATINGS

RELATED APPLICATIONS

The entire subject matter of U.S. Provisional application Ser. No. 60/334,422 filed Nov. 29, 2001 and entitled WHITE PIGMENT FOR USE IN FORMULATIONS INCLUDING WHITE PEARLESCENT PAINT is incorporated by reference. The applicant claims priority benefit under Title 35, United States Code, Section 119(e) of U.S. Provisional application Ser. No. 60/334,422 filed Nov. 29, 2001 and entitled WHITE PIGMENT FOR USE IN FORMULATIONS INCLUDING WHITE PEARLESCENT PAINT.

The entire subject matter of PCT application serial number PCT/CA02/01810, filed Nov. 29, 2002 and entitled WHITE PIGMENT FOR USE IN FORMULATIONS INCLUDING WHITE PEARLESCENT PAINT and designating the United States, is incorporated by reference. The applicant claims priority benefit under Title 35, United States Code, Section 120 of PCT application serial No. PCT/CA02/01810, filed Nov. 29, 2002 and entitled WHITE PIGMENT FOR USE IN FORMULATIONS INCLUDING WHITE PEARLESCENT PAINT and designating the United States.

FIELD OF THE INVENTION

This invention relates to white pearlescent paints, lacquers and primers; their use in an improved process for creating a white "pearl" finish on a painted or lacquered surface; and substrates, particularly vehicle bodies, obtained by said process with said paint.

BACKGROUND OF THE INVENTION

In the automotive industry, a pearlescent white finish is a desirable and highly prized finish colour for automobiles and truck by reason that a pearlescent white finish has been found to be more popular with purchasers than a flat white finish.

Conventionally, in order to create a pearlescent white finish on a vehicle, a three step application process is necessary after the exposed metal parts have been primed with one or more coats of primer. To create the pearlescent white finish, normally, a base coat of white paint is applied, followed by a coating of pearlescent material usually containing mica, which is not pigmented, but rather contains particles of a highly reflective material to provide the "pearl" finish, and finally, a clear coat to seal the underlying layers. Each coating layer must be applied separately, and suitable drying times, and if necessary baking, must be provided prior to the application of each subsequent layer. Consequently, the production of a pearlescent finish is labour intensive and time consuming.

Whenever coats of two different types of paint are applied to a substrate, it is necessary to allow a longer drying time than is needed between multiple coats of the same type of paint. In order to facilitate the proper setting of a three-coat paint finish, drying times are required to set each of the paint undercoat, pearl coat and clear coat. The longer drying times are achieved by having the painted vehicles remaining on the assembly line for additional periods of time. It is not feasible to simply run the assembly line more slowly through the painting section of an automobile assembly plant in order to create longer drying times between paint applications. Instead, the entire assembly line must be lengthened to provide the further travel time during which paint drying can occur. It follows that in order to make the assembly line longer, a larger physical plant space is needed through which to run the assembly line. In manufacturing plants where physical space is at a premium, it may not be possible to set aside additional assembly line length to facilitate multiple times between the application of multiple paint coats. Accordingly, it may not be feasible to offer certain paint finishes on vehicles manufactured at some smaller manufacturing plants.

U.S. Pat. No. 5,871,827 to Jaffe et al. of which the entire subject matter is incorporated herein by reference, discloses two-coat and three-coat automotive finishes and a process for their preparation, wherein polychromism is achieved by incorporating an opaque light interference pigment into the top coat or mid coat. The processes taught by Jaffe involve the use of two coating layers, in which the first contains an opaque white, black or coloured pigment to achieve total hiding, while the second layer, being an interference pigment does not hide the first coating. A clear topcoat is still applied over the pigmented coats in order to complete the finish. The particles of opaque interference pigment taught are multilayered particles having an opaque layer coated with a transparent dielectric layer, which in turn are coated with a semitransparent layer. This would be a relatively complex and expensive coating process to apply, while the result of the process gives polychromatic paint effects.

U.S. Pat. No. 5,350,509 to Sada et al., of which the entire subject matter is incorporated in by reference, discloses a coating structure that includes a colour base, a first coating layer placed on the colour base, having transparent brilliant members contained in the first coating layer, each brilliant member including an alternate lamination of at least two polymers having different refractive indexes and controlling interference light resulting from reflection interference produced by alternate lamination and transmitted light other than interference light.

U.S. Pat. No. 4,499,143 to Panush, of which the entire subject matter is incorporated herein by reference, discloses a transparent topcoat composition containing low pigment to binder ratio of iron oxide encapsulated in mica particles. The teachings of Panush are particularly addressed to producing coloured finishes having depth, clarity and chromaticity. Although this patent states that mica encapsulated iron oxide pigments have inherent hiding capabilities in addition to being pearlescent, they are said to be additive colours. The desired colour results are stated not to be obtainable with metals, e.g. aluminum, and previous pearlescent natural or synthetic pigments. These so called "colorless and opaque" pigments reduce the value of the true coloured pigments and result in gray-cloudy-low chroma colours. In view of the focus on coloured finishes, this patent fails to recognize and teach the value of aluminum as a pigment and hiding material in pearlescent white finishes.

U.S. Pat. No. 4,615,940 to Panush of which the entire subject matter is incorporated in by reference, discloses an opalescent colour effect on a substrate utilizing a multicoat system in which a coloured primer is applied to a surface, followed by a transparent basecoat, and then a clearcoat. This transparent basecoat should tend to have poor hiding qualities, and relatively high light transmittance. In order to compensate for this feature of the basecoat, primers with very effective black and white hiding would be required, and further measures would be necessary to block UV light levels, otherwise there could be significant electrocoat degradation through the transparent basecoat. Additionally, the use of a transparent basecoat requires that the primer layer must be applied carefully and sanded thoroughly, since the transparent basecoat would fail to mask defects in the primer coat.

In the case of conventional titanium dioxide white paint, very large amounts of titanium dioxide pigment are needed in the paint medium in order to achieve adequate hiding power at a reasonable film thickness of, typically, 30 to 50 microns. Such a paint formulation has very little ability to hold more solid particulates, and, therefor, there is little room in the paint mixture left to add a pearlizing material, such as particles of mica.

It is known that adding mica to a conventional white titanium dioxide paint does not change the visible appearance of the white paint. Conventional titanium dioxide-based white paint, having a titanium content exceeding 90% w/w of the pigment solids portion, has a "flat" white appearance notwithstanding the presence of a pearlizing material.

Solvent-based paints can carry from 40 to 60% w/w pigment, whereas water-based paints and primers, on the other hand, which do not dispense the pigment as well, have a lower pigment loading of, for example, in the range of 20 to 35% w/w. In each case, for conventional white paint, 90 percent of the pigment must be white pigment, generally, titanium dioxide. In consequence, the mica flakes are drowned in the large quantity of titanium dioxide pigment is needed to create conventional white paint, and the pearlized appearance of the mica is lost to the eye.

In order to create a conventional white paint pearlescent finish, it has been necessary to apply a pearl coating of mica or another pearlizing material after the white titanium dioxide paint has set in place in order to prevent the "drowning" of the pearlizing material, since a conventional mica pearl coat has no hiding power of its own. The pigmented base coat is required for the hiding properties of the finish, so as to cover sand marks and the like on the article and to create the actual colour of the painted article. The pearl coat merely gives the shiny characteristic that converts a "flat" finish into a "pearl" finish. Since the titanium dioxide white base-coat and the pearl coat are two different types of paints, each requires distinct flash times in order to set each of the coats before other substances are applied to the surface. If no flash time is allowed between the application of a pigmented base coat and a pearl coat paint, striking will occur between the coats. Paint striking is a painting flaw which occurs when the dyes or pigments from a previous paint layer become dissolved in the solvents of a newly applied material and seep through to alter the finish colour of the newly applied material. It is caused by the application of two different types of paint coatings without a long enough flash time between the application of the two coatings. The application of the separate mica pearlizing coating necessitates a separate application step which requires significant adaptation of automotive production lines and causes a substantial increase in the painting cost of each vehicle produced.

"Hiding Power" is a quantitative factor which is critical in determining the make up of paints. Hiding Power may be quantitatively defined as the property of a paint that enables it to completely hide any background over which it is sprayed. Generally speaking, it is accepted within the paint industry that complete hiding is achieved when the paint applied over a black background has a reflectance value of 0.98 of that applied in equal thickness over a white background. Thus, Hiding Power is a contrast ratio of the background and the thickness of paint which is required to reduce the contrast difference to 0.02. The standard figure of 0.02 is based upon the Weber-Fechner contrast law which states that differences of less the 2% (0.02) are imperceptible to the human eye in conditions of moderate illumination.

Hiding Power is produced by the light absorbing properties of pigment particles in a film of paint as applied to a painted surface. If much of the light emerges from the top of the surface of the paint film, and the substrate is not obscured, then the film of paint hides poorly. Most pigments are crystalline in nature. In particular, white pigments when dispersed in a paint medium tend to scatter light strongly. If a single crystal of white pigment were grown sufficiently large, it would be perceived as a shine and transparent glass-like crystal. This light scattering characteristic results in large amounts of light emerging from the surface of the paint film, with corresponding poor hiding power.

Titanium dioxide is the most common white pigment for use in paint. Unfortunately, this pigment has relatively poor hiding power. In order to maintain the white colour, no coloured pigments, which would by definition have greater hiding power, can be present to improve hiding properties. Accordingly, conventional white base coats are heavily laden with titanium dioxide pigment. Thus, in order to achieve a white paint colour with black and white hiding properties at less than 35 microns, the paint must contain at least 90% w/w titanium dioxide which is approaching the maximum pigment content allowable in a paint formulation to still allow the paint to flow and be effectively sprayed onto a surface. By contrast, other paint colours which contain pigments having more effective hiding power may contain approximately 5% w/w pigment.

Thus, while important strides have been made, to date, to provide improved methods for providing white pearlescent paint finishes and compositions, therefor, there remains a need for better paint compositions of use in improving the appearance and the methods of application of the white pearlescent finishes.

SUMMARY OF THE INVENTION

Surprisingly, we have discovered that paint compositions containing solids material comprising relatively specific ratios of components, in admixture with the film former and, optionally, additive ingredients and the like, give greatly improved white pearlescent finishes on substrates, particularly, vehicle bodies.

We have found that a solids material comprising relatively small amounts of a white pigment, for example, titanium dioxide, relatively very small amounts of, for example, particulate metallic aluminum, and relatively very large amounts of, for example, a pearlizing mica with a suitable film former, surprisingly, gives the extremely attractive white pearlescent finish on the substrate.

It is an object of the present invention to provide a white pearlescent paint composition of use in giving an improved white pearlescent paint finish on a coated substrate.

It is a further object to provide an improved process of using said white pearlescent paint composition to obtain said finish on said substrate.

It is a yet further object to provide a method of making said paint composition.

It is a still yet further object to provide a substrate, particularly, a vehicle body surface, coated with said paint composition to provide said white pearlescent finish.

Accordingly, in one aspect the invention provides an improved pearlescent paint composition comprising a film-former and a solids material comprising a pearlizing effective amount of a pearlizing compound, a hiding material and a pigment, the improvement wherein said pigment is white and said hiding material is selected from the groups consisting of metals selected from particulate aluminum, zinc, copper, nickel, stainless steel and alloys thereof, and compounds selected from aluminum oxide, aluminum silicate, hydrated magnesium aluminum silicate, silica, mica, aluminum silicate, magnesium oxide, calcium carbonate, calcium sulphate, calcium metasilicate, anhydrous sodium potassium aluminum silicate, sodium aluminum silicate, alumina trihydrate and barium sulphate in, respective, effective hiding and whitening amounts.

For the sake of simplicity and clarity, in this specification, the term "solids materials" means the solid materials, namely, white pigment, pearlizing compound and hiding material. It does not include any original organic resins or solid material resulting in the film-former or the aforesaid solid additives of use in the paint compositions or cured paint.

The white pigment may be selected, for example, from titanium dioxide of either rutile or anatase structure, zirconium oxide, zinc sulfide, antimony oxide, zinc oxide, white lead carbonate, white lead sulfate, lithopone, barium sulfate, calcium sulfate, calcium carbonate, magnesium silicate, aluminum silicate, and silica in an amount relative to the amounts of pearlizing compound and hiding material, as herein defined.

More preferably, the white pigment is titanium dioxide in an amount selected from 4-7% w/w $TiO_2$ of the solids material. Most preferably, the titanium dioxide is in an amount of 5.0±1% w/w.

The hiding material is, preferably, particulate metallic aluminum in an amount selected from 0.2-3.0% w/w Al, most preferably, 0.5±0.3% w/w Al. One form of aluminum of use in the practice of the invention is a metallic aluminum paste in isopropyl alchohol, sold under the trade-mark "STAPA IL Hydrolan™" 2192 55900/G (Eckart America). The Al may have a coating of $SiO_2$.

The metallic Al component in the defined ratios and absolute amounts according to the invention further most advantageously provides an aesthetic sparkle effect and further assists paint flow viscosity control properties.

Preferred pearlizing compounds may comprise a natural or synthetic, coated or uncoated mica or white mica compound, known in the art. Examples of commercial synthetic micas are known in the art under the trade-marks Colorstream™, Xirallic™, Iriodin™/Afflair™, and Mearlin™. Other examples include $TiO_2$ and $Fe_2O_3$ coated mica. Natural organic materials includes natural pearlessence, guanine, and hypoxanthane purines from fish scales.

The mica compound(s) content is preferably at least 90% w/w of the solids material, and most preferably, about 94.0±1% w/w.

One preferred mica pearlizing compound is known under the trade-mark XIRALLIC® T60-20 SW Sunbeam Gold, having a particle size of 5-30 μm.

The film formers of use in the compositions of the invention may be suitably selected from those generally of use in solvent or aqueous bases in paint and lacquer formulations known in the art. Preferably, the film former is selected from those based on acrylic, urethane, polyester, or melamine formaldehyde resins. Preferred acrylic resins are acrylamide, acrylonitride, methyl acrylate, and ethylhexyl acrylate.

A preferred composition comprises about 7-8% acrylic, about 1% urethane, about 6% polyester and about 5% melamine formaldehyde resins on a w/w basis of the total paint composition, as applied to a substrate.

The paint compositions according to the invention may, optionally, further comprise one or more additives selected from UV protectants, extenders, polymerization catalysts and rheology additives.

In a further aspect, the invention provides a process for producing a pearlescent white finish on a substrate comprising applying a pearlescent white paint composition as hereinabove defined on said substrate; and curing said composition on said substrate.

The substrate may be any desirable, suitable surface of an object or article, but most preferably, the object is an automobile, truck, or like object.

Thus, in a further aspect, the invention provides an aforesaid substrate coated with a pearlescent white finish as hereinabove defined by a process as hereinabove defined.

In one embodiment, a paint composition as hereinabove defined, is applied as a base coat to a thickness of approximately 18 to 25 micrometers and may be set or cured by ambient flash dehydration and/or baking in an oven. A clear coat may also be applied to a thickness of approximately 35-45 micrometers, thereon.

Thus, in a further aspect, the invention provides a process for producing a pearlescent white finish on an object comprising the steps of applying to the object a base coat of the pearlescent white paint formulation according to the invention, setting the base coat, applying a clear coat to the base coat and setting the clear coat.

The aforesaid base coat as hereinabove defined may be used, alone, over a primer or Electrocoat, as the final finish on a substrate, without a clearcoat finish.

That such a very small amount of hiding component with such a very low amount of white pigment in such a vast amount of pearlizing material can provide such an attractive pearlescent white paint finish is most surprising.

In the most preferred embodiments, the most expensive solids material, namely, titanium dioxide, used as the whitening pigment can be substituted to such a large degree to provide such an aesthetically visual appealing finish, in a cost-effective, efficacious manner is also most surprising.

Judicious selection of the pearlizing compound, hiding component and whitening pigment, in their respective effective amounts is within the skill in the art from the guidance herein described.

BRIEF DESCRIPTION OF THE DRAWINGS

Several preferred embodiments of the present invention will now be described, by way of example only, with reference to the appended drawings in which.

DETAILED DESCRIPTION OF THE INVENTION

Figure 1:
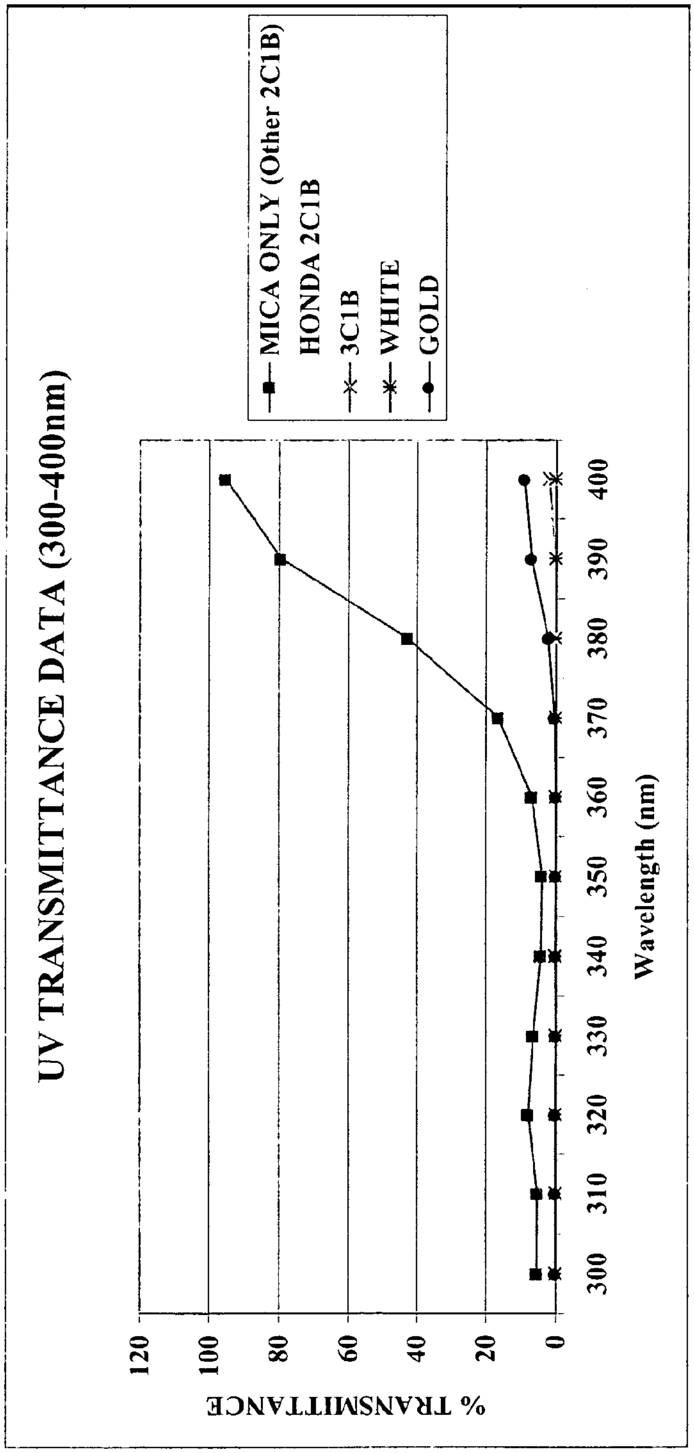
FIGS. 1 to 7 are plots of wavelength versus percent light transmittance for several coatings.

Hereinbelow, reference is made to solids loading or percentage of components on a % w/w basis of the solids material. For clarity, the solids concentration is assumed to be 100 percent of the paint, but will not, in fact be 100 percent, given the need for solvents, film-formers, and additives.

The white paint composition according to one general embodiment of the present invention is particularly effective for use in the creation of a pearlescent white finish on painted substrates, particularly, automobile and truck surfaces. An exemplified pearlescent coating is shown schematically at 10 in FIG. 1*a* which is formed on a metal surface 12 having an ecoat layer 14. In this case, a primer layer 16 is applied to the ecoat layer 14 and a pearlescent layer 18 is applied on the primer 16 and finished with a clear coat layer 20. The pearlescent layer 18 comprises a pearlescent mica constituent, a second constituent, namely, metallic aluminum which contributes to hiding, but in a manner which does not overpower or drown out the pearlescent effects imparted on the coating by the pearlescent constituent or the whitening effect of a third constituent, namely, titanium dioxide. This constituent makeup and function of the pearlescent coating is represented by the two directional cross-hatching. The details of preferred pearlescent coatings are described in more detail hereinbelow.

Figure 1A:
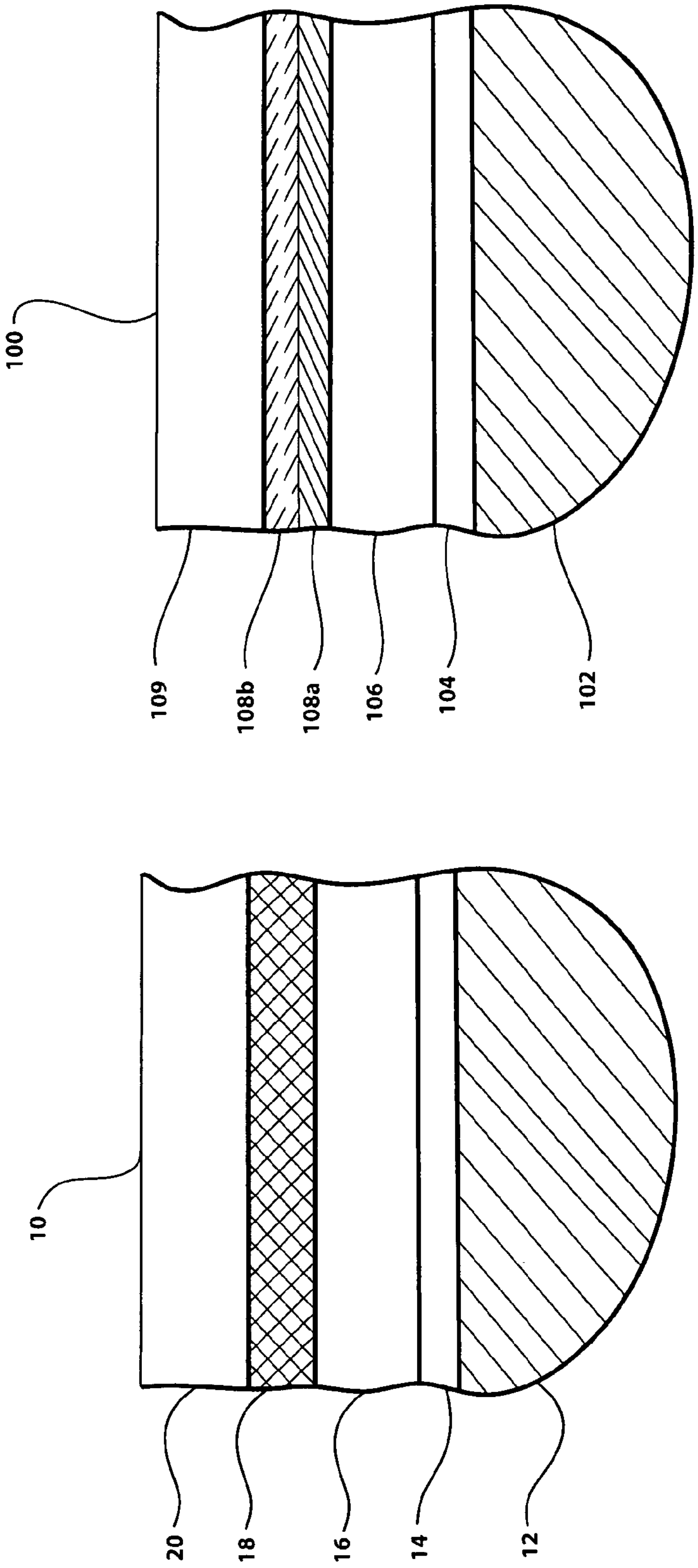
FIG. 1*a* is a schematic representation of two coatings.
Figure 2:
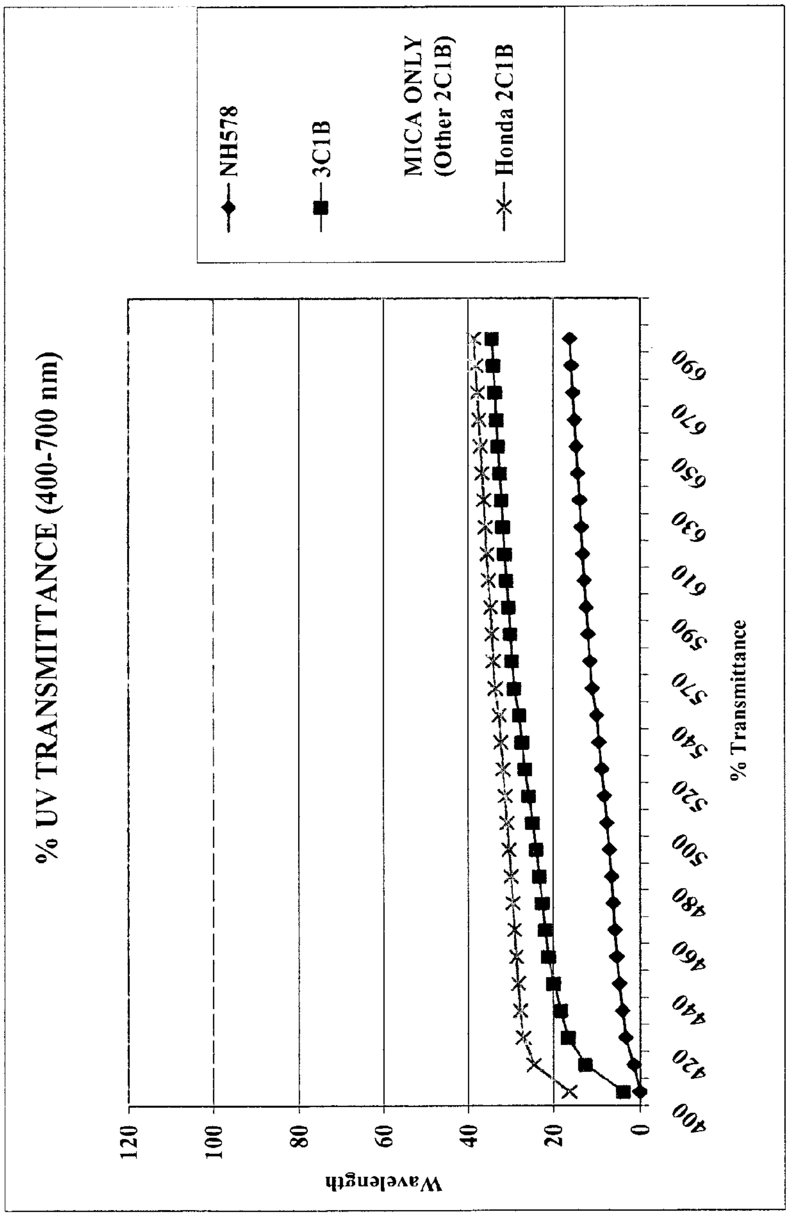
Figure 3:
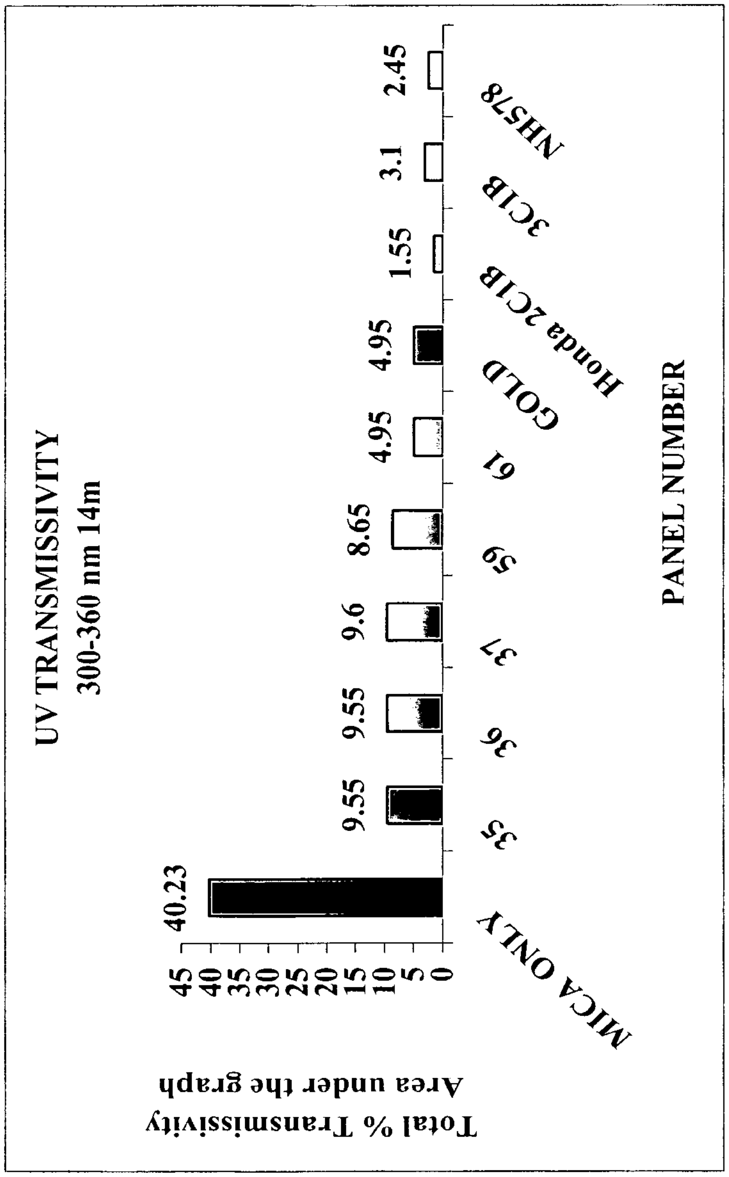
Figure 4:
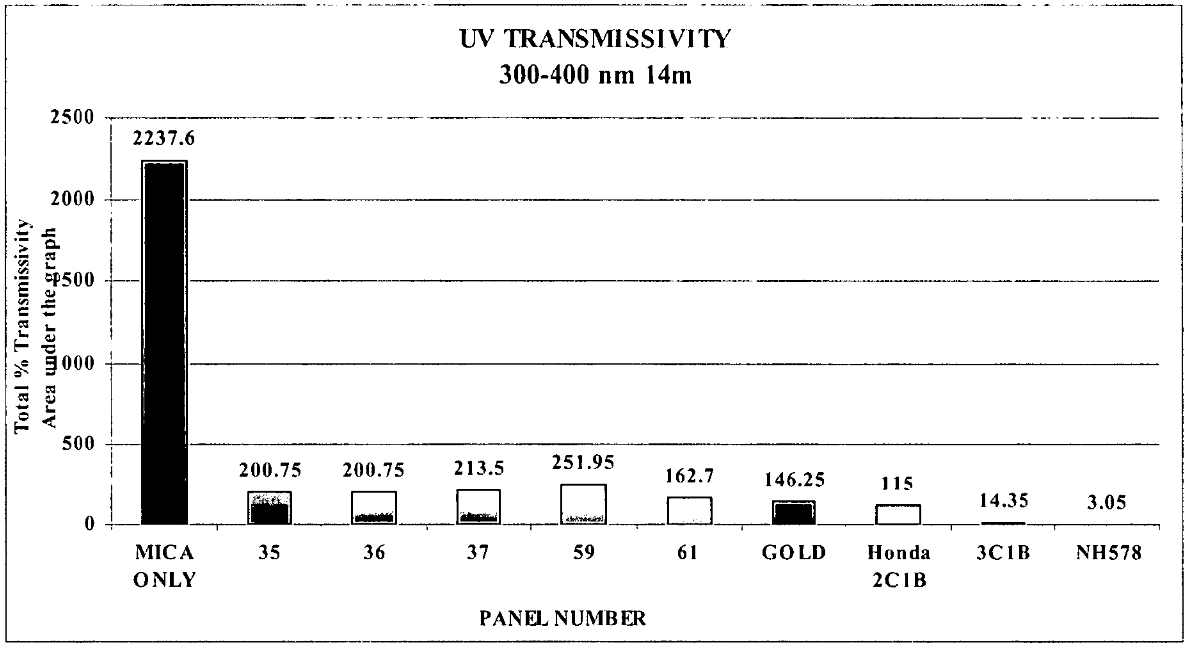
Figure 5:
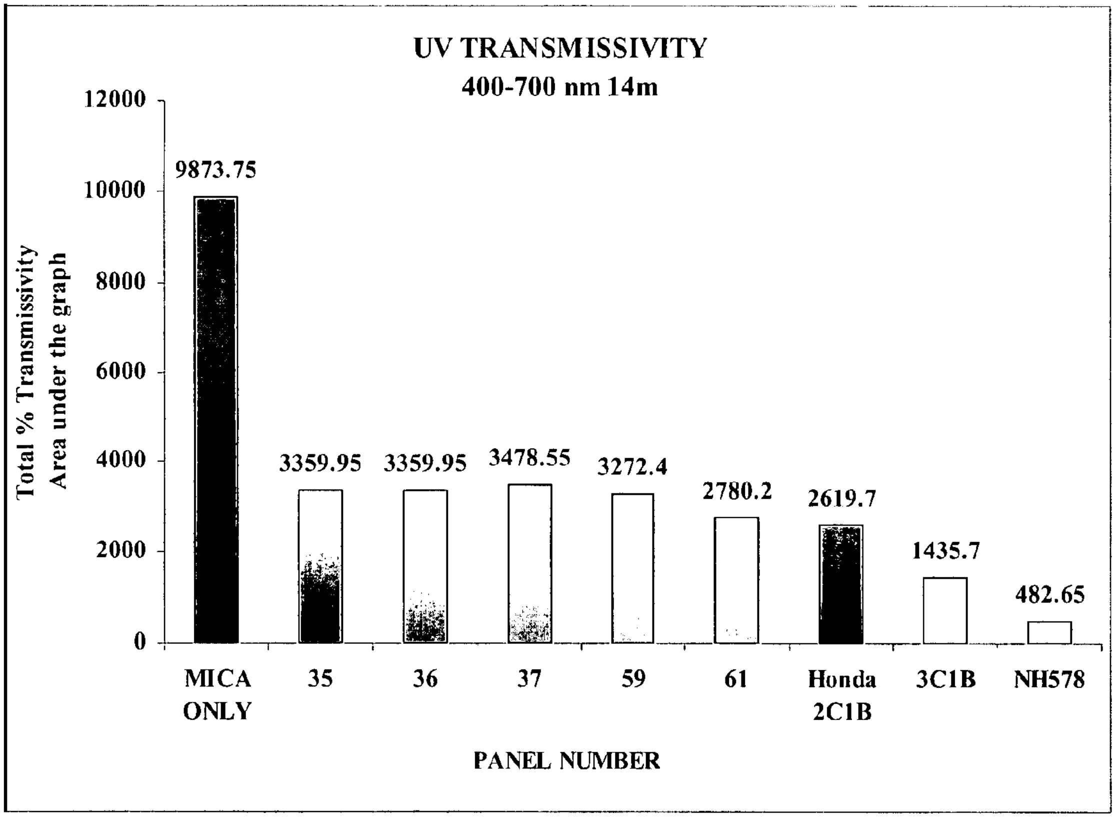
Figure 6:
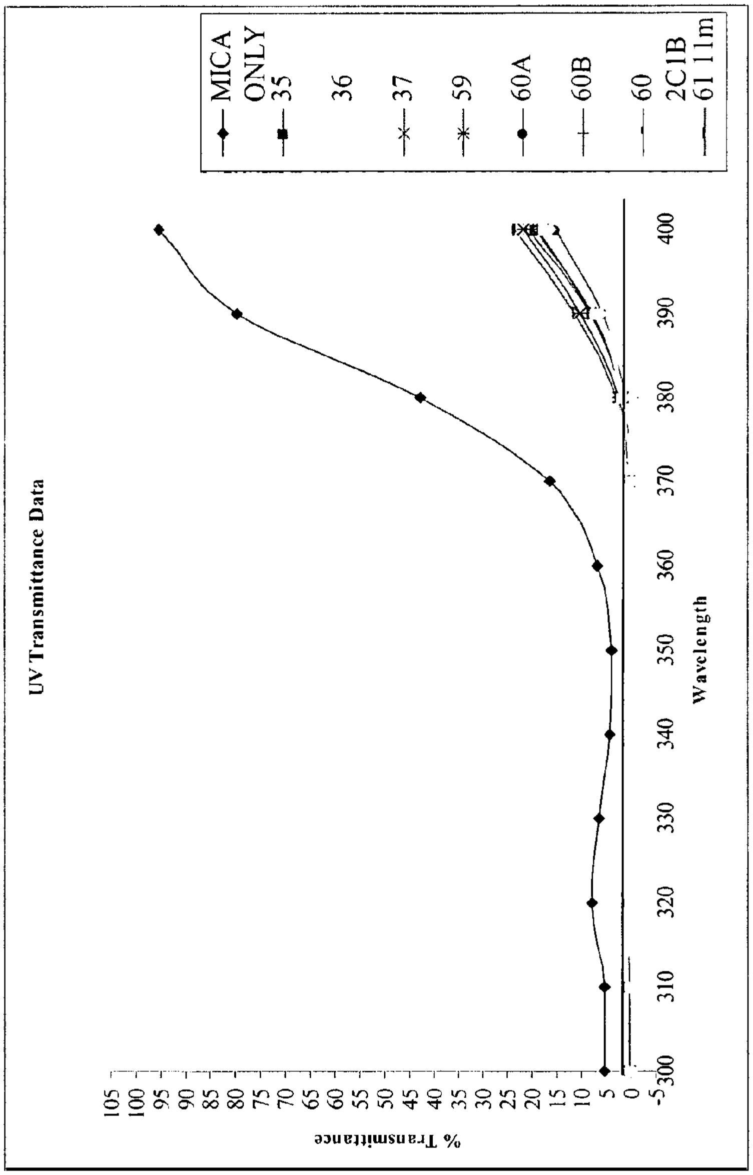
Figure 7:
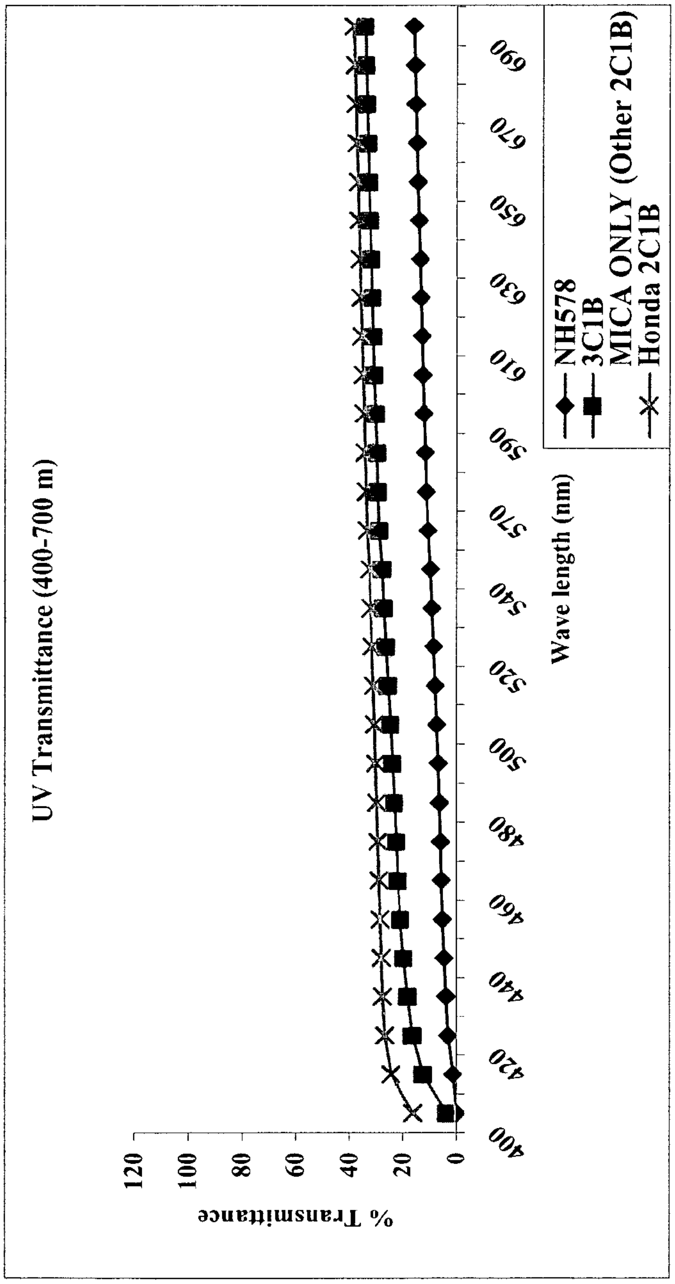

For comparison purposes, an exemplified pearlescent coating is also shown in FIG. 1*a*, this time schematically at 100, according to the prior art. The coating is formed on a metal surface 102 with an ecoat layer 104. In this case, a first base layer 106 is applied to the ecoat layer 104, typically a primer coat, and a second base layer 108*a* with titanium dioxide pigment is applied on the first base layer. A pearlescent layer 108*b* is applied to the second base layer 108*a* and the coating is finished with a clear coat layer 109. In this case, the pearlescent layer 108*b* has a pearlescent but no other constituent which contributes to hiding. Rather, the hiding effects are left to the second base layer 108*a*. Thus, the single component nature of the pearlescent layer 108*b* is represented by the unidirectional cross hatching.

In order to create a pearlescent white paint finish, an effective amount of reflective or pearlizing material must be added to the paint. Many pearlizing materials are known and used in the paint industry to create a pearlized finish in paint products. Any suitable pearlizing agent may be used in conjunction with one embodiment of the present invention, though the most common pearlizing material is mica flakes.

A particularly preferred form of mica flakes is available from Merck KgaA under the trade-mark XIRALLIC®. The XIRALLIC® formulation is in the form of hexagonal flakes having a particle diameter greater than 10 micrometres and an aspect ratio (defined as particle diameter/thickness) of 5-10. Other less preferred flaked forms of mica can also be successfully used, either alone, or in combination with the XIRALLIC® product. The proportions of mica in different flaked forms can be varied, depending on the pigment properties desired, and upon the tolerance for increased manufacturing costs which result from the use of increased proportions of the preferred XIRALLIC® product form.

Other pearlizing materials may include naturally occurring mica platelets which have been coated with metal oxides, synthetic materials such as alumina or silica flakes which are coated with highly refractive metal oxides such as titanium dioxide or iron oxide, bismuth oxychloride crystals, natural pearlescent guanine and hypoxanpurines obtained from fish scales. References to mica in the present description are used for illustrative purposes only, and are not intended to limit the range of pearlizing materials which may be used to create a pearlescent white finish with the white pigment of the present invention and in pigment formulations comprising the white pigment of one embodiment according to the present invention.

To achieve an appropriately desirable pearlescent look, we have found that the amount of titanium dioxide should be lower than 15% of the total solids content. Increasing the percentage of titanium dioxide in the formulation beyond this level decreases the pearlescent effect. For example, it has been found that when the level of titanium dioxide is lower than 35%, the pearlescent coating containing it starts to present what can be described as a "pearl white". At 35% it is very lightly sparkly white. At 25% it starts to become a pearl white but not a very "clean" pearl effect due to the high level of titanium dioxide. Surprisingly, it has been found that pearlescent layers containing titanium levels below about 15% begin to develop a true white pearl but the hiding is also much lower, but in which the latter can be offset by adding a portion of a hiding material as hereinabove defined to improve hiding and reduce light transmission, to maintain white and improve sparkle.

If solids material according to the present invention is used to formulate the white paint, it contributes sufficient hiding properties as a base-coat paint at a much lower weight percent, such as, for instance, ranging from about 15 to about 60 weight percent, than could be achieved by using titanium dioxide on its own as done in conventional coatings. In accordance with a preferred embodiment of the present invention, replacing at least a portion of the titanium dioxide of conventional coatings with a solids material comprising aluminum and/or one of the other hiding materials as hereinabove defined, instead of titanium dioxide, results in a loading of within the range of %0.1-to 2% by weight of the total solids content. The exact weight percent depends upon the final desired colour position of the white pearlescent paint. If a slightly bluish white colour is desired, the loading may exceed 10%. However, if a yellowish white colour is preferred, then loading should not exceed 10%. It has been determined, as a practical matter, that an effective loading of aluminum at a level of less than 2% of total solids produces a most desirable white pearlescent paint.

It has been further discovered that the formulation of a pearlescent coat in accordance with one embodiment of the present invention has superior hiding and UV light blocking properties when compared with conventional pearlescent coatings. In accordance with one embodiment of the present invention, a pearlescent formulation is provided for a coating material comprising a solids composition and a substantially transparent paint backbone. In this case, a range of backbones may be used to form coatings herein described, including those backbones mentioned in the patents mentioned in the background section hereinabove. The solids composition includes an effective amount of a first pearlescent constituent selected to impart a pearlescent effect to the coating and an effective amount of a second or more hiding material selected to hide to the naked eye local remedial sanding regions having a roughness not exceeding 500 grit, for example when the aforesaid solids composition is in a coating applied at a thickness of about 11 microns.

However, there may be, some cases where the pigment composition is capable of hiding roughness higher than 500 grit, for example 350 grit. For instance, there may be greater quantities of the second constituent added to the solids composition and the thickness of the coating containing the solids composition may exceed 11 microns.

A preferred pearlescent coat formulation in accordance with one embodiment of the present invention has the following solids material constituents:

$TiO_2$ (5.0%)

Mica (XIRALLIC™ mica (94.5%))

Aluminum (STAPA IL Hydrolan™) $SiO_2$ coated, paste in isopropyl alcohol

The aluminum particles may be relatively large or coarse particles, having particle sizes ranging in size from 1 to 2 microns in thickness, and 100 to 200 microns in diameter. The coarse particles have been found to provide the surprising benefit of enhancing the pearlescent effect of the pearlescent material by imparting a "flip flop" effect, a term which is known to those of skill in the art. Moreover, the coarse aluminum aids in hiding and the blue/gray influences on the colour of the solids as the result of using metallic aluminum, may be compensated by a relatively small portion of titanium dioxide, for example at a range of between about 4.7% to about 5.3% and more preferably, 5±1%. Course aluminum is available from Delta colours Inc. and/or Silberline Mfg. Co., Inc. Metallic aluminum for use in paint compositions is generally sold as "aluminum paste-leafing" or "aluminum paste-nonleafing" in a paste according to specific particle size distribution.

The aluminum particles may also be fine particles, that is particles having a size range of 0.1 to 1 microns in thickness, and 0.1 to 100 microns in diameter. These particles may, for example, include the pigments commercially available from "Delta colours Inc." and/or Silberline Mfg. Co., Inc., which may be used as supplied or milled or otherwise processed to reduce their size, or size range profile, to suit the application.

Figure 8:
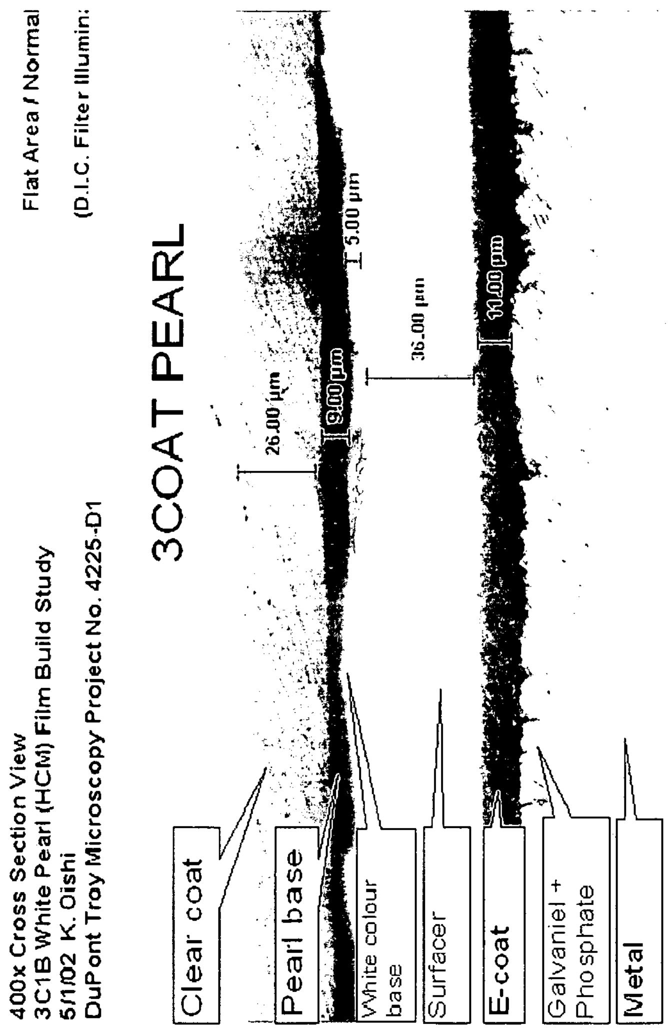
FIG. 8 is a micrograph showing one panel coating in cross section.
Figure 9:
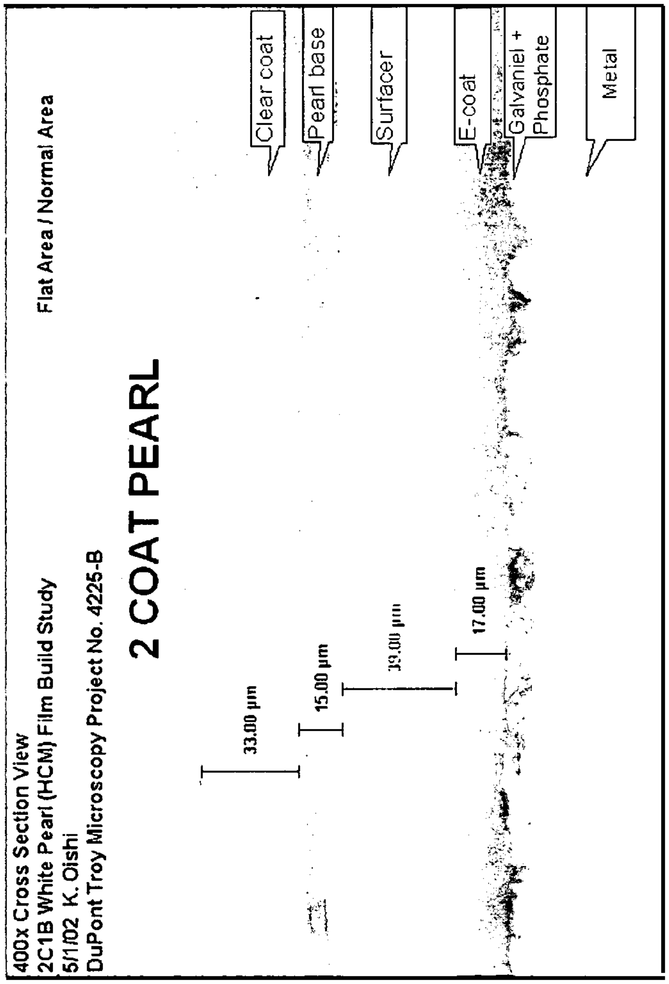
FIG. 9 is another micrograph showing another panel coating in cross section.
Figure 10:
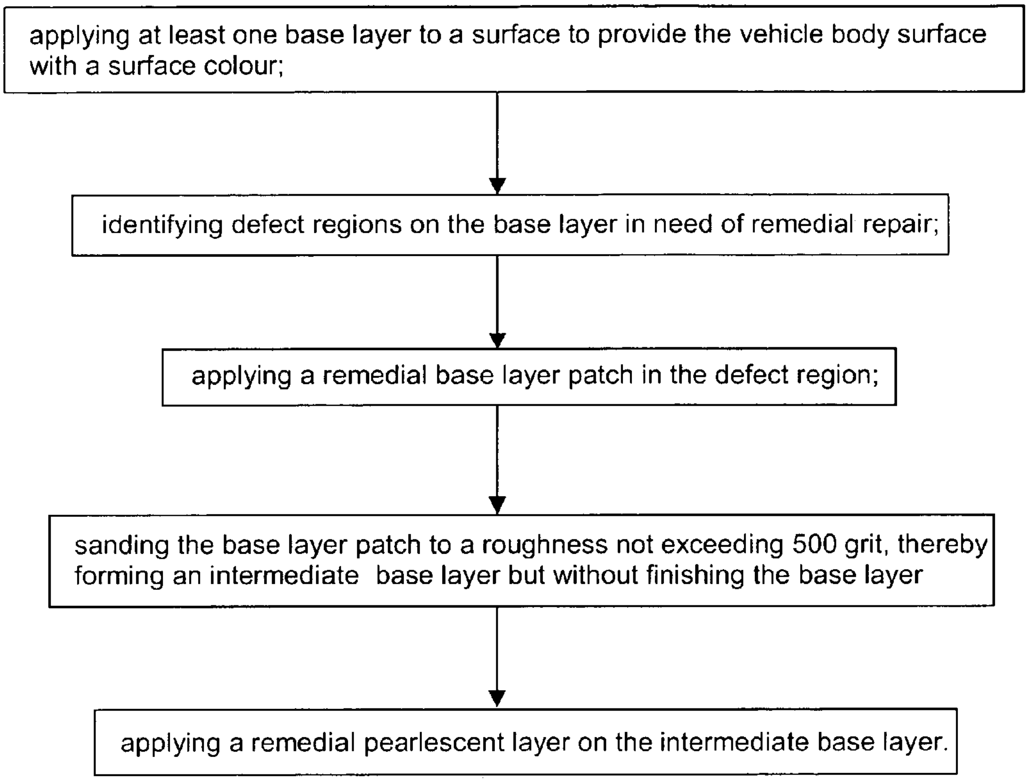
FIG. 10 is a flow diagram of a method of coating.

The pearlescent formulation according to the present invention is effective at hiding and also UV blocking, in some cases to the extent that the coating may be used to function in the automotive painting process in a manner analogous with a paint layer, not a pearlized clear coat layer. This functional advantage of the formulations according to specific embodiments of the present invention permits the use of a 2-coat painting system instead of a 3-coat painting system to obtain a pigmented pearlized automotive paint finish. Reference may be had to FIGS. 8 and 9 in order to understand the comparison between a 2-coat and a 3-coat painting system.

Another particular feature of other embodiments of the present invention is the ability to employ polymer backbones in water based systems. This provides considerable environmental benefits, since water based systems have the advantage of very low volatile organic content (VOC), compared with their organic solvent based counterparts. In this case, the solids loading required to employ solids of use according to embodiments of the present invention can be deliver in a water system since solids loadings may be limited to 20 to 35 percent. Thus, the present solids materials effectively eliminates the need for the 90 percent white pigment requirement in conventional white paints and be deployed in these desirable water systems. In accordance with another of its aspects, the present invention provides a pearlescent coating for a vehicle having an e-coat (electro-coat primer conventional in the painting and sealing of metal components in the automotive industry) and an outer coating applied to the e-coat. In this case, the outer coating portion includes at least one primer layer applied to the e-coat layer and a pearlescent layer according to the invention applied to the primer layer. The thickness of the primer layer is preferably in the range of from about 15 to 40 microns, more preferably from about 30 to about 40 microns. The pearlescent layer according to the invention preferably has a thickness ranging from about 7 to 20 microns, more preferably from about 11 to about 15 microns. The pearlescent coating can be formulated to be capable, in some cases, of absorbing about 85 percent of UV radiation landing on the coating, for example under conditions wherein the coating has a thickness of 14 microns.

The hiding ability of the pearlescent formulation in accordance with the present invention additionally displays a further useful advantage in that not only does the pearlescent formulation achieve, in some cases, black and white hiding, as discussed hereinabove, but it also achieves physical hiding. In other words, the application of the pearlescent formulation to a slightly irregular surface will have the effect of concealing the physical irregularities in the surface, or to the changes in the localized remedial repair region, and rendering them invisible to the human eye. This is particularly important for white paint finishes.

Localized remedial repair regions may be, for example, a location on the vehicle where a drop of paint, a physical obstruction, such as an unwanted particle of steel or paint, for example, is embedded in the paint, both of which are determined to be removed or corrected by sanding or other processing prior to pearlescent painting.

A method of forming a finished vehicle white paint coating has been developed comprising the following steps, wherein a base layer, preferably a primer layer, is formed, to which a pearlescent layer according to the invention is applied to impart a pearlescent effect to a finished vehicle paint coating, without which, physical deformations in the at least base layer are visible in the finished vehicle paint coating. The formulation of the pearlescent layer is in accordance with the general formulation defined hereinabove, and, more particularly with the specific sample formulations identified in Table 1 and particularly Table IV.

In practical application on the assembly line of an automobile plant, the hiding properties of the pearlescent formulation are used to advantage in the following additional steps added to the method describe in the previous paragraph. The primer layer is inspected for any painting defects such as drips or sags. If there are any such defects, defect regions on the primer layer in need of remedial repair are identified. A remedial base layer patch is applied in the defect region. The primer layer patch is sanded to a roughness which would be equivalent to that produced by sanding using finer sand paper than a 500 grit, for example, thereby forming an intermediate primer layer but without finishing the base layer. A remedial white pearlescent layer according to the invention is applied which includes the constituents in a sufficient quantity to hide physical deformations in the primer layer which are otherwise visible to the naked eye and which does not otherwise overpower the pearlescent effects of the pearlescent constituent.

Thus, one embodiment of the present invention provides a method of applying a white pearlescent finish to a vehicle by utilizing less overall pigment compared with that utilized in the prior art. In this case, a portion of the hiding requirement of the finish is contributed by a hiding material as hereinabove defined, other than the pearlescent material. This provides the significant technical effect of reducing the mean thickness of primer coat being applied over the ecoat (or its equivalent). For example, a conventional primer coat might require a minimum mean thickness of 45 microns to provide more than the minimum hiding needed to, for example, to filter the UV light to which the finished surface will be exposed. In this case, a safety margin of say 10 percent might be imposed so that any remedial repair of an obscure location on the vehicle surface which is known to receive a statistically thinner primer coating. In this case of one embodiment of the present invention, that safety margin can still be implemented, but with less primer (for example at a mean thickness of about 30 microns, namely at about a 30% reduction), given that the pearlescent layer may also be applied to provide hiding and UV filtering as well.

Embodiments of the present invention will be described with reference to the following examples which are presented for illustrative purposes only and are not intended to limit the scope of the invention.

TABLE I

| TEST | RUN | Pearlescent Coating Compositions 33 | 34 | 35 | 36 | 37 | 38 | 39 | 40 | 41 |
|---|---|---|---|---|---|---|---|---|---|---|
| White (grams) | | 1.84 | 1.84 | 1.84 | 1.84 | 1.84 | 1.81 | 1.77 | 1.74 | 1.81 |
| | Titanium | 0.96 | 0.96 | 0.96 | 0.96 | 0.96 | 0.96 | 0.96 | 0.96 | 0.96 |
| | Other | 0.88 | 0.88 | 0.88 | 0.88 | 0.88 | 0.85 | 0.81 | 0.78 | 0.85 |
| Mica (grams) | White mica | 16.91 | 16.91 | 14.24 | 14.24 | 2.68 | 16.85 | 16.4 | 15.95 | |
| | Xirallic mica | | | | 2.68 | 14.24 | | | | 16.58 |
| | Gold mica | | | 2.68 | | | | | | |
| Aluminium (grams) | | 1.75 | 0.125 | 0.25 | 0.25 | 0.25 | 0.98 | 1.92 | 2.83 | 0.98 |
| | Coarse | | 0.05 | 0.096 | 0.096 | 0.096 | 0.384 | 0.768 | 1.12 | 0.384 |
| | Other | | 0.075 | 0.075 | 0.075 | 0.075 | 0.596 | 1.152 | 1.71 | 0.596 |
| | Fine | 0.06 | | | | | | | | |
| | Other | 1.69 | 0.075 | | | | | | | |
| | Gold | | 0.04 | | | | 0.32 | 0.64 | 0.96 | 0.32 |
| | Other | | 0.085 | | | | 0.66 | 1.28 | 1.87 | 0.66 |
| Paint resin | | 81.25 | 81.25 | 81.25 | 81.25 | 81.25 | 79.65 | 78.12 | 76.64 | 79.65 |
| Balance clear(grams) | | 218.3 | 219.9 | 219.7 | 219.7 | 219.7 | 220.7 | 221.8 | 222.8 | 221.0 |
| TOTAL WEIGHT (grams) | | 320 | 320 | 320 | 320 | 320 | 320 | 320 | 320 | 320 |
| PERCENTAGE (in formulation of 100%) | | | | | | | | | | |
| Mica | (16.91/320) * 100 | 5.3 | 5.3 | 4.5 | 4.5 | 0.84 | 5.3 | 5.13 | 5.0 | |
| Xirallic | | | | | 0.84 | 4.45 | | | | 5.2 |
| Gold mica | | | | 0.84 | | | | | | |
| Fine Aluminium | (0.06/320) * 100 | 0.02 | | 0.03 | 0.03 | | | | | |
| Coarse Al | | | 0.016 | 0.030 | 0.030 | 0.030 | 0.120 | 0.240 | 0.350 | 0.120 |
| Gold aluminium | | | 0.013 | | | | 0.100 | 0.200 | 0.300 | 0.100 |
| Titanium | (0.96/320) * 100 | 0.3 | 0.3 | 0.30 | 0.30 | 0.30 | 0.30 | 0.30 | 0.30 | 0.30 |
| Gold Mica | | | | | | | | | | |
| Total pigment % composition of the formula | | 5.6 | 5.6 | 5.6 | 5.6 | 5.6 | 5.8 | 5.9 | 5.9 | 5.7 |
| Percentage of the solids composition: | | | | | | | | | | |
| MICA | | 94.3 | 94.2 | 93.6 | 93.6 | 94.1 | 91.0 | 87.4 | 84.0 | 90.9 |
| ALUMINIUM | | 0.3 | 0.5 | 1.1 | 1.1 | 0.5 | 3.8 | 7.5 | 11.0 | 3.9 |
| TITANIUM DIOXIDE | | 5.4 | 5.3 | 5.3 | 5.3 | 5.3 | 5.2 | 5.1 | 5.1 | 5.3 |
| TOTAL | | 100.0 | 100.0 | 100.0 | 100.0 | 100.0 | 100.0 | 100.0 | 100.0 | 100.0 |

For greater clarity, looking at column 33, the calculation of percentage Mica was determined by dividing the total weight of mica (16.91 g) by the total weight of 320 g, arriving at 5.3 percent percent. The calculation of percentage of Fine aluminum was determined by dividing the total of fine aluminum (0.06 g) by the total weight of 320 g arriving at 0.02 percent. Similarly, the calculation of percentage of Titanium Dioxide was calculated by dividing the total of Titanium Dioxide (0.96 g) by the total weight of 320 g, arriving at 0.3 percent.

The percentage of Mica of the solids composition was determined by dividing the percentage of Mica (5.3) by the total pigment percent composition (5.6) to arrive at 94.3 percent.

The percentage of Aluminum of the solids composition was determined by dividing the percentage of aluminum (in this case 0.02) by the total pigment percent composition (5.6) to arrive at 0.3 percent.

The percentage of Titanium Dioxide of the solids composition was determined by dividing the percentage of Titanium Dioxide (in this case 0.3) by the total pigment percent composition (5.6) to arrive at 5.4 percent.

Black and white testing to determine the hiding properties of the pearlescent coating according to one embodiment of the present invention gave the following results. A layer of pearlescent coating according to one embodiment of the present invention achieved black and white hiding if applied in a layer 90 microns thick. By contrast, a coating of conventional pearlescent white mica (XIRALLIC™) by itself achieved the same hiding but only if applied in a layer at least 581 microns thick.

Tests have been performed to assess the UV radiation filtering ability of the pearlescent formulation according to one embodiment of the present invention.

Samples of selected the pearlescent formulations were tested by exposure to UV radiation for an extended periods of time for percent light transmission by following method, Preparation: Each film was free of substrate. Primer was sprayed out on PP (poly-propylene) plaques, while the top coat only panels were sprayed out on Mylar® plastics sheets. This is due to the concern of top coat UV stabilizer package migrating into the PP. The primer was sprayed out in a wedge over 2 panels from 0 to 57 microns.

Test method: The film was placed in the middle cell of an autographic spectrophotometer (measure the spectral transmittance) fixture and scanned from 705 to 297 nm in 1 nm increments. Surface area (% nm) was internally calculated by the machine for the UV and visible regions. A mark was made on the top of the strip to indicate where to measure film thickness where each measurement occurred. Machine error was less than 1%, however, care needs to be taken that the entire cell window is filled with the free film sample.

A control sample of a pearlescent formulation containing only mica was subjected to the same test conditions. The data obtained is identified in Table 2 below, where the right hand column shows the application of UV radiation at increasing wavelengths, and the remaining columns show the wavelength of the light in nanometers. The columns indicate type of paint.

MICA—XIRALLIC™ only pearl coat 14μ film thickness

2C1B—Honda pearl coat at 14μ film thickness

3C1B—Conventional 3-coat white pearl (7μ colour base and 7μ pearl base)—total film thickness is 14μ

White—Conventional flat white paint at 14μ film thickness

Gold—Gold coloured paint at 14μ film thickness.

TABLE 2

| | UV TRANSMITTANCE | | | | |
|---|---|---|---|---|---|
| Wavelength | MICA | 2C1B | 3C1B | WHITE | GOLD |
| 300 | 5.45 | 0.03 | 0.12 | 0.02 | 0.17 |
| 310 | 5.23 | 0.01 | 0.03 | 0.03 | 0.14 |
| 320 | 7.91 | 0.01 | 0.18 | 0.04 | 0.09 |
| 330 | 6.52 | 0.05 | 0.01 | 0.01 | 0.07 |
| 340 | 4.23 | 0.03 | 0.02 | 0.09 | 0.04 |
| 350 | 4.01 | 0.01 | 0 | 0.06 | 0.04 |
| 360 | 6.88 | 0.06 | 0.02 | 0.01 | 0.06 |
| 370 | 16.38 | 0.1 | 0.02 | 0 | 0.4 |
| 380 | 42.7 | 0.74 | 0.02 | 0 | 2.2 |
| 390 | 79.5 | 4.13 | 0.14 | 0.01 | 7 |
| 400 | 95.35 | 12.69 | 1.87 | 0.09 | 9 |

Turning now to FIG. 1, in order to demonstrate the effectiveness of the pearlescent formulations according to one embodiment of the present invention, the data was plotted in a graph of percentage transmittance of UV radiation against increasing wavelength of UV radiation.

The graph clearly demonstrates that as wavelength increases, the transmittance of UV radiation through the mica only control sample increases significantly, peaking at almost 100% at 400 nm. By contrast, the pearlescent formulations demonstrate impressive UV radiation filtering ability, with the percent transmittance being less than 10% 400 nm.

Tests have been performed to assess and demonstrate the physical hiding ability of the pearlescent formulation. A primed surface was abraded with sanding grit of standardized roughness, being 100, 200, 300, 360, 400, 500, 600, 700, and 800 grit. A pearlescent formulation in accordance with the present invention was applied to the abraded test surfaces in accordance with standard paining practices in the automotive industry. The pearlescent formulation was applied in a layer 11 microns thick. The test results demonstrated that abrasions of a roughness of 500 grit were not visible to the naked eye after the application of the pearlescent formula. The application of the pearlescent formulation to the 360 grit abrasion did not cover all scratches, and similarly, coarser abrasions were not hidden.

Preferred compositions according to the invention were prepared according to standard procedures known in the art, for the preparation of paint compositions, in the following relative amounts on a % w/w basis, shown in Table 3, comprising the film-former precursor and solids materials listed Table 4.

TABLE 3

| | Water | Solvent | Lacquer |
|---|---|---|---|
| SOLIDS MATERIALS | | | |
| Titanium dioxide | 0.25 | 0.25 | 0.25 |
| Aluminum | 0.025 | 0.025 | 0.025 |
| Mica | 4.75 | 4.75 | 4.75 |
| RESINS | | | |
| Acrylic | 7.47 | 18.15 | 20 |
| Urethane | 0.96 | | |
| Polyester | 5.8 | | |
| Melamine formaldehyde | 4.82 | 19.4 | |
| Microgel | | 12.91 | |
| ADDITIVES | | | |
| Extender | 0.35 | 0.39 | 0.35 |
| Rheology additives | 0.4 | | |
| UV Additives | 0.19 | 0.78 | 0.78 |
| Catalyst | | 0.39 | 0.39 |
| Solvent | 17.76 | 42.95 | 73.45 |
| Water | 57.225 | | |
| | 100 | 100.00 | 100.00 |

TABLE 4

| | |
|---|---|
| Polyester resin | Bayhydrol D 155 (Bayer)/Polyester resin 5770.84 Cargil) |
| Acrylic | 2-Hydroxy ethyl acylate (HEA Dow Chemical/ MMMA Methyl methacrylate) |
| Melamine Resin | Luwipal 066 (BASF) |
| Urethane | U 610 (Alberdingk & Boley) |
| Catalyst | Nacure X49-110-King Industries) |
| Rehology additive | Tego WetZFS 453 |
| UV Additive | TinUVin 384/TinUVin 292 (CibaGeigy) |
| Microgel | TEGO Disperss 630 |
| Extender | Talc fine grade powder (St. Lawrence Chemical lnc) |
| Titanium Dioxide | Ti Pure Dupont |
| Aluminium | STAPA IL Hydrolan 2192 55900/G Eckart America L. P |
| Mica | Xirralic T 60-10 WNT Crystal silver by Merck |

The aforesaid paint composition according to the invention was applied above a white primer coat on a simulated car body surface, cured and subsequently coated with a conventional clear coat to give a so-called “two-coat” pearlescent white finish. Comparative two-coat and three-coat pearlescent white finishes according to the prior art were prepared and compared in FIG. 11, wherein lines A and B denote two-coat white pearl compositions according to the prior art; line C denotes a three-coat white pearl composition according to the prior art; and line D denotes a two-coat white pearl composition according to the invention. Each of the aforesaid paints has a top clear coat composition.

Figure 11:
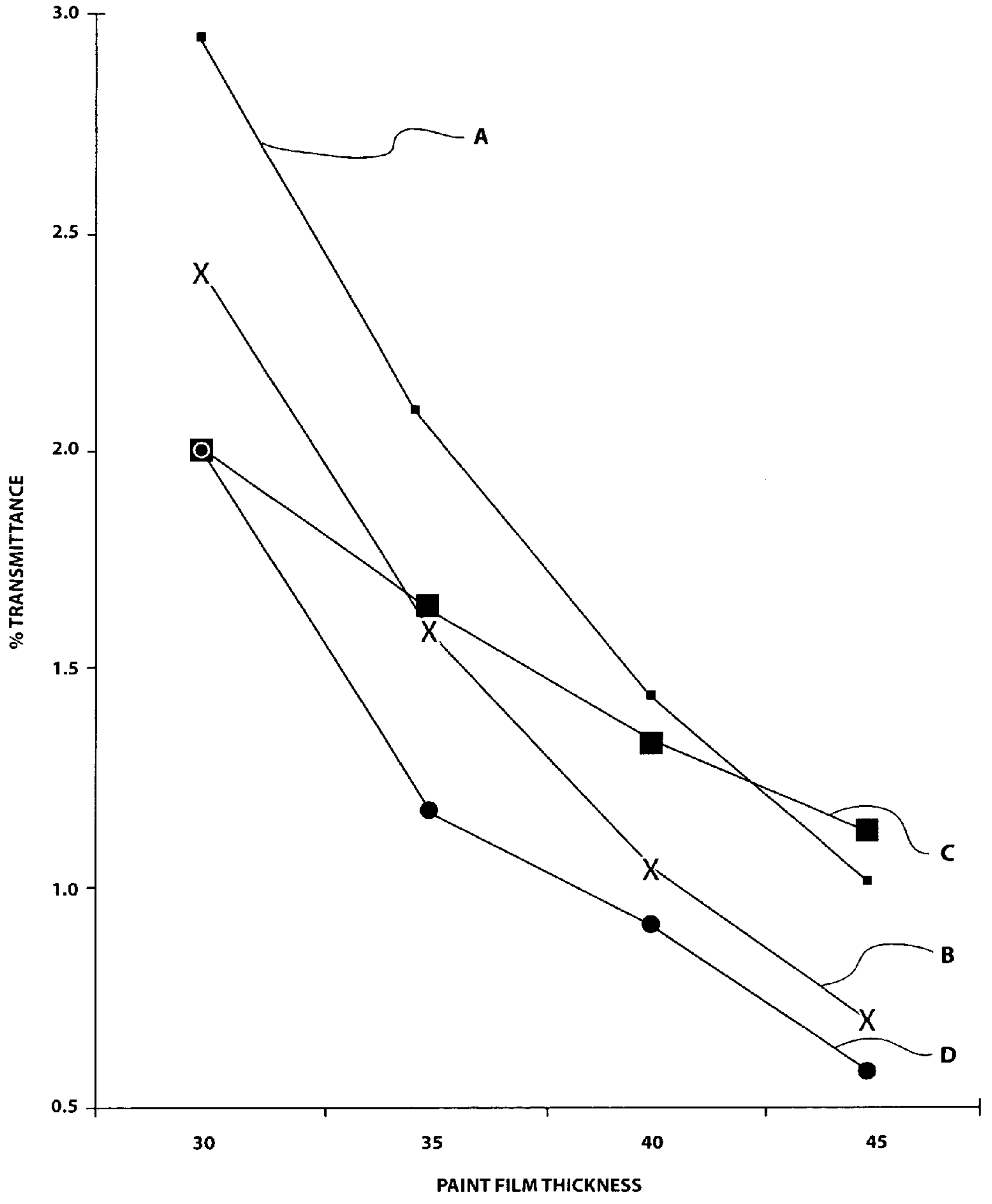
FIG. 11 represents a comparative graph of the % transmittance at various paint film thicknesses for a two-coat pearlescent white paint according to the invention in comparison with prior art two- and three-coat pearlescent white paint films.

FIG. 11 shows the much superior cost-effective film thickness of the cured paint film while providing significantly improved transmittance value.

While the compositions, coatings, methods and substrates hereinabove described are applied with reference to vehicle surfaces, it will be understood that they are also usable on other surfaces, such as those covering a range of industrial and personal products, plastics, metals and the like. Therefore, the above description is not intended to limit the invention entirely to the preferred field of vehicle surfaces.

Further, although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. A process for producing a pearlescent white finish on a cured white primer surface of a substrate which process comprises spray coat applying an improved pearlescent white paint composition comprising a film-former and a solids material consisting of at least 90% w/w non-coated mica, 4-7% w/w $TiO_2$, and 0.2-3.0% w/w particulate metallic aluminum, in, respectively, effective whitening and hiding amounts to the cured white primer surface of said substrate; and curing said composition on said substrate to provide a cured pearlescent white finish.

2. A process as defined in claim 1 further comprising applying a clear coat to said cured finish and curing said clear coat.

3. A process as defined in claim 1 wherein said substrate is a vehicle body.

4. A process as defined in claim 1, wherein said mica is selected from the group consisting of natural, synthetic, and white mica compound.

5. A process as defined in claim 4 wherein said particulate metallic aluminum is coated with $SiO_2$.

6. A process as defined in claim 1, wherein the solids material consists of 94.0±1% w/w mica, 5.0±1% w/w $TiO_2$, and 0.5±0.3 w/w aluminum.

7. A process as defined in claim 1 wherein film-former is selected from the resin group consisting of an acrylic, urethane, polyester and melamine/formaldehyde.

8. A process as defined in claim 1 wherein said composition comprises a formulation base selected from the group consisting of an aqueous, solvent and lacquer base.

9. A process as defined in claim 7 or claim 8 wherein said composition comprises about 7-8% acrylic, about 1% urethane, about 6% polyester and about 5% melamine formaldehyde resins on a w/w basis.

10. A process for producing a pearlescent white finish on a cured white primer surface of a substrate which process comprises spray coat applying an improved pearlescent white paint composition in a formulation base selected from the group consisting of an aqueous solvent and lacquer, the improved pearlescent white paint coating composition further comprising a film-former and a solids material consisting of at least 90% w/w non-coated mica, 4-7% w/w $TiO_2$, and 0.2-3.0% w/w particulate metallic aluminum, in, respectively, effective hiding and whitening amounts to the cured white primer surface of said substrate; and curing said composition on said substrate to provide a cured pearlescent white finish.

11. A process for producing a pearlescent white finish on a cured white primer surface of a substrate which process comprises spray coat applying, in a single white pearlescent layer on the cured white primer surface, an improved pearlescent white paint composition comprising a film-former and a solids material consisting of at least 90% w/w non-coated mica, 4-7% w/w $TiO_2$, and 0.2-3.0% w/w particulate metallic aluminum, in, respectively, effective hiding and whitening amounts; and curing said composition on said substrate to provide a cured pearlescent white finish.

* * * * *